United States Patent
Okihara et al.

[11] Patent Number: 5,859,737
[45] Date of Patent: *Jan. 12, 1999

[54] MAGNETIC RECORDING AND/OR REPRODUCING APPARATUS HAVING A SEARCH PATTERN AND DATA ARRANGED IN A LONGITUDINAL TRACK FOR FACILITATING A HIGH SPEED SEARCH

[75] Inventors: Daijirou Okihara, Tokyo; Yukio Taniyama, Kawasaki, both of Japan

[73] Assignees: Sony Corporation, Tokyo; Fujitsu Limited, Kanagawa, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 625,090

[22] Filed: Jun. 21, 1996

Related U.S. Application Data

[63] Continuation of Ser. No. 407,401, Mar. 17, 1995, which is a continuation of Ser. No. 211,957, filed as PCT/JP93/00503, Apr. 19, 1993, abandoned.

[51] Int. Cl.⁶ ..................................................... G11B 5/09
[52] U.S. Cl. .............................................................. 360/48
[58] Field of Search ................................. 360/48, 49, 62, 360/72.2, 74.5, 39, 47, 69, 53, 123; 371/37.4, 2.2; 434/307 R; 386/112

[56] References Cited

U.S. PATENT DOCUMENTS

| | | |
|---|---|---|
| 3,932,894 | 1/1976 | Arter et al. ......................... 360/72.2 X |
| 4,011,587 | 3/1977 | Arter et al. ................................. 360/62 |
| 4,298,897 | 11/1981 | Arter et al. ................................. 360/39 |
| 4,689,022 | 8/1987 | Peers et al. ............................ 360/69 X |
| 4,772,963 | 9/1988 | Van Lahr et al. ......................... 360/47 |
| 5,274,513 | 12/1993 | Nakano et al. ......................... 360/72.2 |
| 5,294,949 | 3/1994 | Robinson et al. ..................... 360/48 X |
| 5,313,341 | 5/1994 | Okihara et al. ............................ 360/48 |
| 5,321,562 | 6/1994 | Hamada et al. .......................... 360/48 |
| 5,325,370 | 6/1994 | Cleveland et al. ...................... 371/37.4 |
| 5,327,305 | 7/1994 | Thomas .................................. 360/74.5 |
| 5,341,251 | 8/1994 | Fincher et al. ............................ 360/49 |
| 5,341,378 | 8/1994 | Shih ...................................... 360/49 X |
| 5,361,179 | 11/1994 | Suzuki et al. .......................... 360/72.2 |

FOREIGN PATENT DOCUMENTS

| | | |
|---|---|---|
| A-0 509 641 | 10/1992 | European Pat. Off. . |
| WO-A-84 02221 | 6/1984 | WIPO . |

*Primary Examiner*—Thang V. Tran
*Assistant Examiner*—Patrick Wamsley
*Attorney, Agent, or Firm*—Frommer Lawrence & Haug, LLP; William S. Frommer; Dennis M. Smid

[57] ABSTRACT

In a magnetic recording and/or reproducing apparatus applied to an external storage of computers, a recorded file can be searched easily. A recording track is helically formed on a magnetic tape to record file data, and management data are recorded at the beginning of the magnetic tape, and a search pattern is recorded on the recording track along the longitudinal direction at a location of the magnetic tape that corresponds to the management data of the beginning of the magnetic tape.

5 Claims, 9 Drawing Sheets

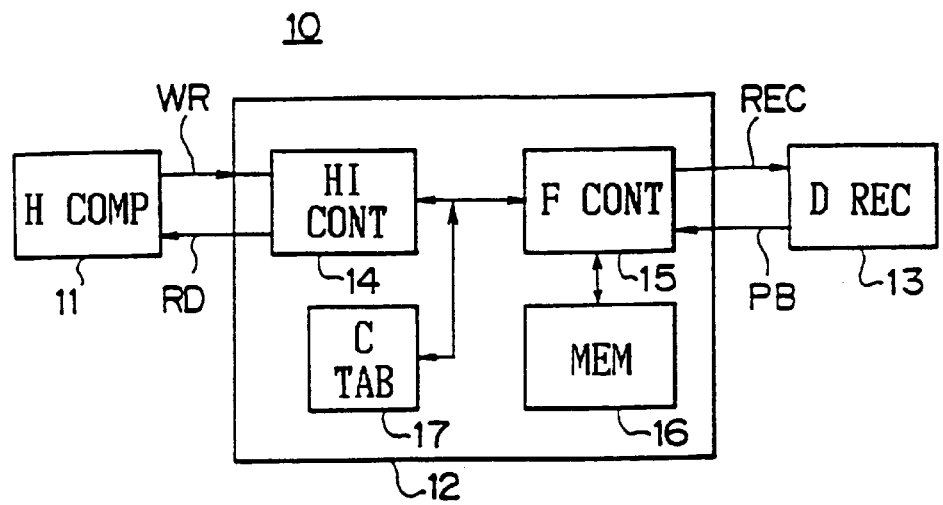
FIG. 1
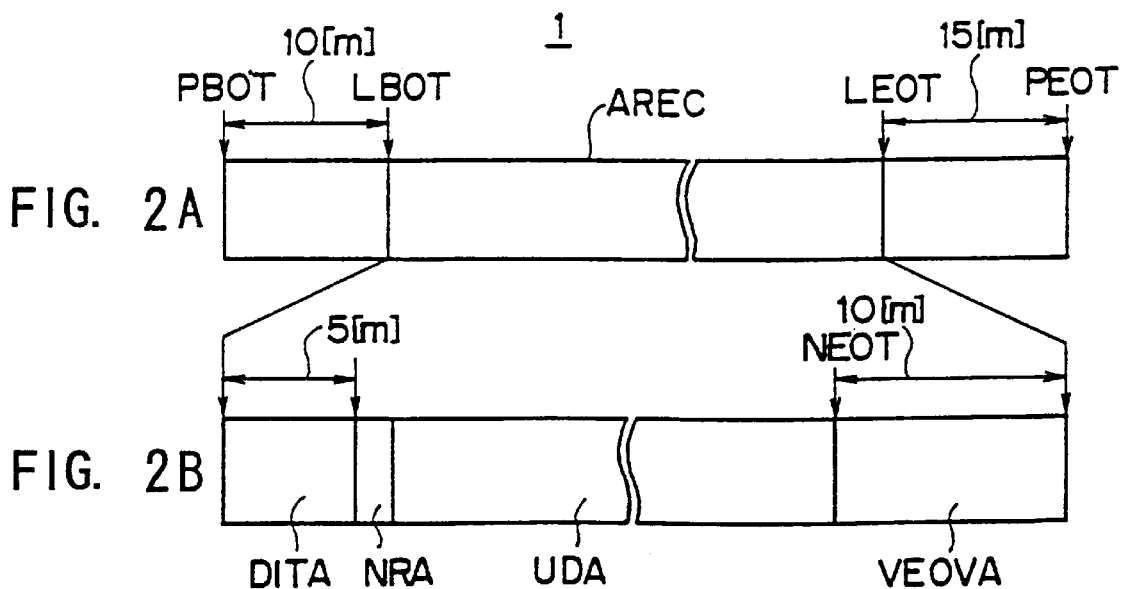
FIG. 2A
FIG. 2B

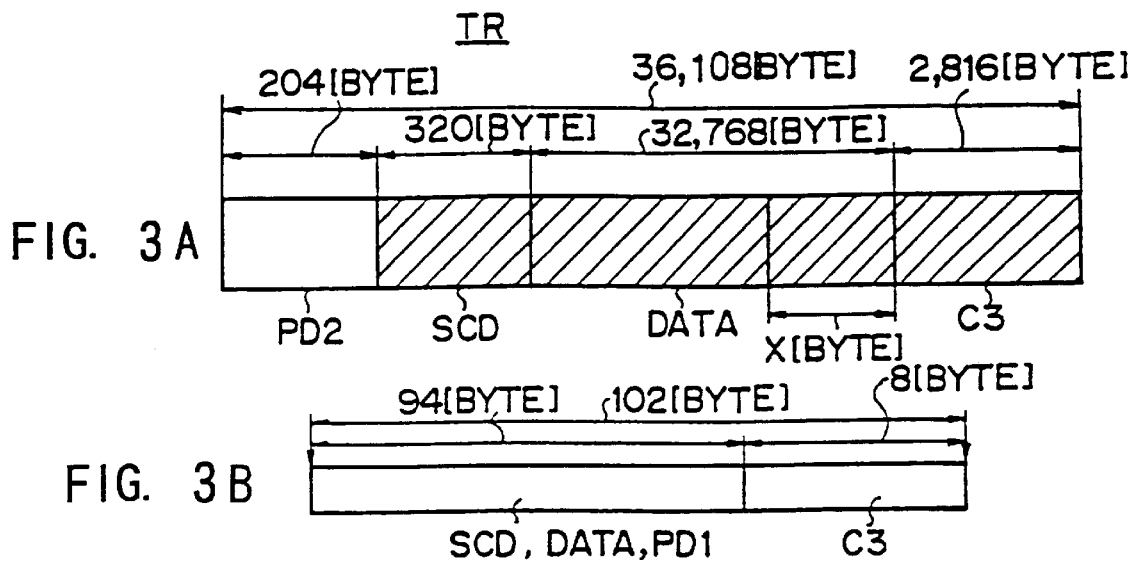
FIG. 3A
FIG. 3B
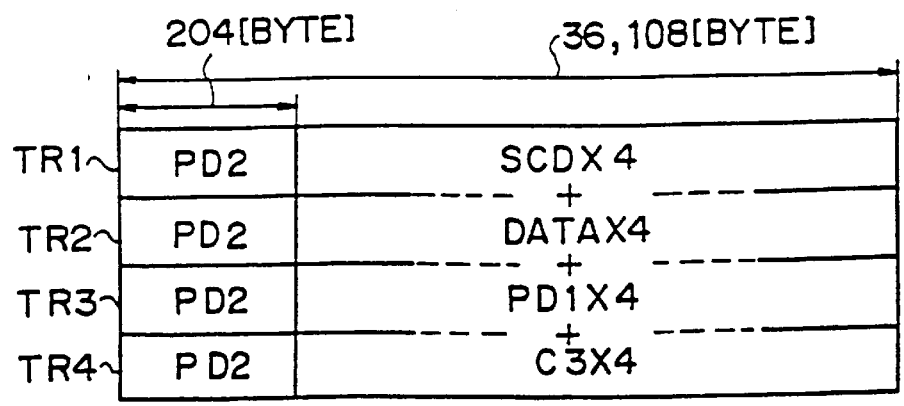
FIG. 4

| | 0 BYTE | 1 BYTE | 2 BYTE | 3 BYTE |
|---|---|---|---|---|
| 0 WORD | TAPE MARK ID | | | |
| 1 WORD | BLOCK NUMBER | | | |
| 2 WORD | TRACK NUMBER | | | |
| 3 WORD | TRACK NUMBER | | | |
| 4 WORD | WRITE-RETRY NUMBER | | | |
| 5 WORD | FILE NUMBER | | | |
| 6 WORD | BLOCK NUMBER | | | |
| 7 WORD | 00000000 | | | |

|         | 0 BYTE | 1 BYTE | 2 BYTE | 3 BYTE |
|---------|--------|--------|--------|--------|
| 0 WORD  | TAPE MARK TRACK ID ||||
| 1 WORD  | TAPE MARK BLOCK NUMBER ||||
| 2 WORD  | TAPE MARK TRACK ID ||||
| 3 WORD  | TAPE MARK BLOCK NUMBER ||||
| 2N-1    |        |        |        |        |
| 2N      |        |        |        |        |

FIG. 10

MAGNETIC RECORDING AND/OR REPRODUCING APPARATUS HAVING A SEARCH PATTERN AND DATA ARRANGED IN A LONGITUDINAL TRACK FOR FACILITATING A HIGH SPEED SEARCH

This application is a continuation of application Ser. No. 08/407,401 now abandoned, filed Mar. 17, 1995 which is a continuation of application Ser. No. 08/211,957, filed as PCT/JP93/00503, Apr. 19, 1993 (now abandoned).

FIELD OF THE INVENTION

This invention relates to a magnetic recording and/or reproducing apparatus with respect to, for example, an external storage device of a computer.

BACKGROUND OF THE INVENTION

Heretofore, a previously proposed magnetic recording and/or reproducing apparatus has employed the ID-1 format data recorder (ANSI x34.175-1990 19 mm Type (D-1 Recorded Instrumentation), in which helical recording tracks are sequentially formed on a magnetic tape to record and reproduce desired data with high density.

FIG. 11 illustrates a magnetic tape 1 that includes a plurality of tracks recorded by the ID-1 format data recorder. Magnetic tape 1 is wrapped around a rotary drum and rotated at a predetermined speed. The magnetic tape 1 is run at a predetermined speed, so that recording tracks TRs (TR1, TR2, TR3, TR4, TR1, TR2, . . . ) are helically and sequentially formed by a magnetic head mounted on the rotary drum. In this manner, desired data are recorded onto recording track TR1.

Also at this time, the data recorder forms recording tracks TA, CTL, and TC, which extend along the longitudinal direction of magnetic tape 1. Recording track TA is located at the upper portion of magnetic tape 1, and recording tracks CTL and TC are located at the lower portion of magnetic tape 1. The data recorder records the track set ID of the recording track TR in the recording track CTL.

The track set ID contains absolute position information, and it is recorded from the beginning of the magnetic tape 1, at locations that are in between the predetermined synchronizing signals that correspond to each set of 4 recording tracks (TR1 . . . TR4).

The recording tracks TA, CTL, and TC contain user management data which permits high density data recorded on magnetic tape 1 to be searched easily.

In the data recorder, when information is recorded on the recording track TR, the recorded information includes a parity code of a product code. The parity code is used for error detection and correction, thereby enhancing the reliability of data recorded on and reproduced from magnetic tape 1.

That is, as shown in FIG. 12, after the data recorder takes in a predetermined unit of data (comprising 36,108 bytes and hereinafter designated as data field DATA), it divides the data field DATA into 306 blocks, and adds to each block a Reed-Solomon error detecting and correcting code.

Furthermore, the data recorder divides each block into a first and second field, FIELD0 and FIELD1, and then adds a Reed-Solomon error detecting and correcting code (designated as C1) so as to orthogonalize with the C2 code in each of the fields FIELD0 and FIELD1.

Thereby, in the data recorder, the reproduced data are error-corrected by using the C1 and C2 codes, thereby improving the bit error rate.

Further, when the data field DATA, including the C1 and C2 codes, is recorded onto the magnetic tape 1, the data recorder interleaves the data field DATA in recording track TR. Thereby, the data field DATA can be reproduced reliably, even in the presence of a drop-out.

In other words, in the data recorder, assuming that the data field DATA has been supplied as a sequence designated by arrows a1, a2, . . . , an−1, an, an+1, an+2, . . . ax−1, and ax, the data field DATA is recorded in a different sequence as shown by arrows b1, b2, . . . bn−1, bn, in order to interleave the above data field DATA.

Furthermore, the data recorder adds to each data field DATA a synchronizing signal SYNC and a sync block data ID (hereinafter referred to as "sync block"). During the recording of the data field DATA, the data recorder also adds a preamble and a postamble to the data field DATA.

During reproduction of magnetic tape 1, the synchronizing signal SYNC, the sync block data ID, and the data DATA are reproduced with reference to track sync data included in the preamble, which allows the magnetic recording and/or reproducing apparatus to deinterleave the data field DATA with reference to the above synchronizing signal SYNC and the sync block data ID.

If a drop-out occurs in magnetic tape 1, this deinterleave-processing prevents errors that exceed the error-correcting capability of the C1 and C2 codes from concentrating on one part of the reproduced data.

By reproducing, in this manner, data arranged in the ID-1 format, a bit error rate of about $10^{-10}$ can be achieved, which is satisfactory for practical use as a data recording and/or reproducing apparatus mainly for measurement.

If this bit error rate can be improved to about $10^{-15}$, then the magnetic recording and/or reproducing apparatus can store the data of computer systems used at banks, etc., for example, thus expanding the utility of this type of data recorder.

Further, since this type of data recorder can record high-density data, an improvement of the bit error rate will facilitate the management of the magnetic tape by collectively recording a plurality of files onto a magnetic tape.

However, the drawback to the collective recording of a plurality of files in this manner is that the search for particular files become difficult.

One possible solution is to retrieve data by performing a high-speed search on the high-density tape. However, since the magnetic head helically crosses respective recording tracks, the desired data cannot be reliably reproduced when high-speed searching is used. Thus, this method of retrieving data is insufficient for the previously proposed data recorder.

SUMMARY OF THE INVENTION

In accordance with the present invention, a magnetic recording and/or reproducing apparatus is provided for easily and reliably searching a desired file recorded on a magnetic tape.

To solve the problems presented in the previously proposed system, predetermined file data D0 that is supplied from a file management device 11 are recorded onto tracks TR1, TR2, TR3, etc., of a magnetic tape by magnetic recording devices 12 and 13. The magnetic tape 1 begins with area DITA, which is allocated to a management information area. Area DITA includes management information FIT, which represents the beginning of the recording position of the file data D0. A recording track TC is recorded along the longitudinal direction of magnetic tape 1 and is formed at the upper and the lower sides of magnetic tape 1. The longitudinal recording track TC is allocated to the search area of the file data DO, and a search pattern TREC is recorded to the search area corresponding to the management information FIT. The longitudinal track TC is provided with a search area for the file data DO and recorded therein is the search pattern TREC. Thereby, the desired track can be easily searched with reference to the search pattern TREC.

According to this invention, the recording track is formed along the longitudinal direction of the magnetic tape, and the search pattern is recorded at the recording track corresponding to the management data of the beginning of the magnetic tape. Thus, a magnetic recording and/or reproducing apparatus in which a desired file can be easily searched by using the search pattern is obtained.

BRIEF DESCRIPTION OF THE DRAWINGS

The following detailed description, given by way of example and not intended to limit the present invention solely thereto, will best be understood in conjunction with the accompanying drawings in which:

FIG. 1 is a block diagram showing a computer system according to one embodiment of this invention;

FIGS. 2A and 2B are schematic diagrams illustrating the recording area on its magnetic tape;

FIGS. 3A and 3B are schematic diagrams illustrating the recording format on the magnetic tape.

FIG. 4 is a schematic diagram explaining the interleave-processing between recording tracks;

FIG. 10 is a schematic diagram explaining the file information table;

DETAILED DESCRIPTION OF THE INVENTION

Figure 5:
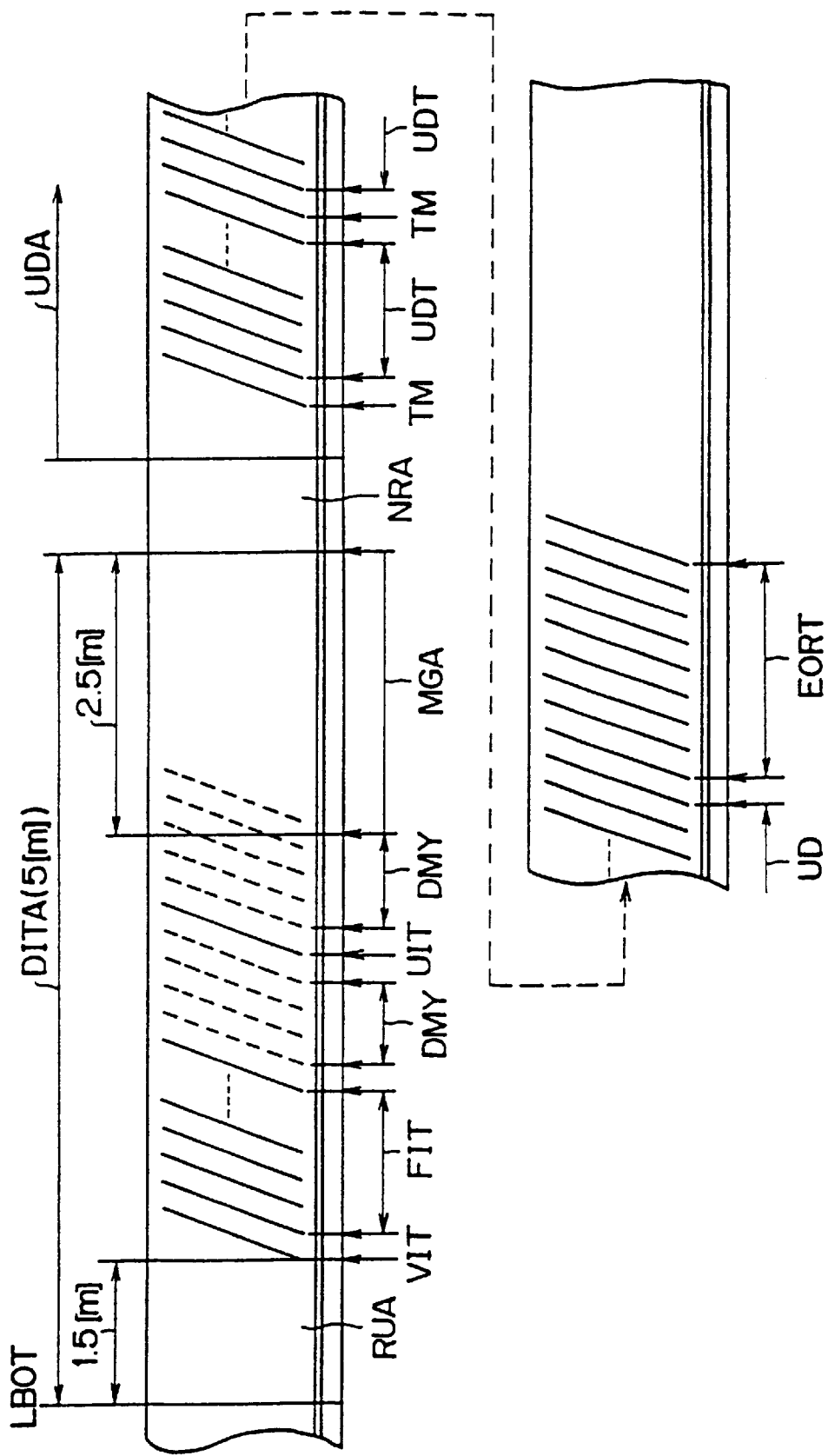
FIG. 5 is a schematic diagram illustrating the track format on the magnetic tape.

FIG. 1 illustrates a computer system 10 according to one embodiment of the present invention. Host computer 11 sends write data request WR to recorder control apparatus 12, which supplies to ID-1 format data recorder 13 the write data request WR in the form of recording data REC. In this manner, the write request WR is written to a recording track on the magnetic tape.

In order to reproduce the data on the magnetic tape of the data recorder 13, host computer 11 issues a read request to data recorder 13, which responds by issuing reproducing data PB to recorder control apparatus 12. Recorder control apparatus 12 then sends to host computer 11 the contents of the reproducing data PB in the form of read data RD.

In the data recorder control apparatus 12, a host interface control unit 14 controls a channel interface that exists between the host computer 11 and the data recorder control apparatus 12, and the format control unit 15 formats the data that are sent to or received from the data recorder 13 by using a memory 16. Further, the contents of control table 17 are accessed when control information is communicated between the host interface control unit 14 and the format control unit 15.

In the computer system 10, by providing the data recorder control apparatus 12, the data recorder 13 can be used as an external memory of the host computer 11 by using the same interface as a conventional magnetic tape apparatus at the side of the host computer 11.

FIGS. 2A and 2B illustrate the arrangement of track areas in the magnetic tape 1, which is loaded into the data recorder 13. The center of magnetic tape 1 along its longitudinal direction is used as the location of recording area AREC because this location has comparatively less damage than the edge areas of the tape. Thus, this arrangement of the recording area AREC improved the bit error rate.

FIG. 2A illustrates that the logic beginning position (LBOT) of magnetic tape 1 is located substantially 10[m], for example, from the physical beginning position (PBOT) of magnetic tape 1. Also, the logical end position (LEOT) of the tape is located substantially 15[m], for example, from the physical end position (PEOT) of the magnetic tape 1. Thus, the area between the logical beginning position LBOT and the logical end position LEOT comprises the recording area AREC.

In the recording area AREC, as shown in FIG. 2B, track area DITA, with a length of, for example, 10[m] is used to store directory information.

Following track area DITA is a track are NRA, which is used as a "no recording" area. The next track area is the user recording track area UDA, the end position of which (NEOT) is substantially 15[m], for example, before position LEOT. Also, an area from the vicinity of the end NEOT to the logical end LEOT is used as a volume end information area VEOVA.

FIGS. 3A and 3B illustrate a user data area of 36,108 bytes that is formatted in accordance with the ID-1 format. The formatted data is interleaved every 4 tracks, so that the bit error rate can be improved.

Note that, FIG. 3A conceptually shows the kinds of information and lengths included in 1 track, and FIG. 3B is an example of the C3-error correcting block used before ID-1 formatting.

In the computer system 10, as shown in FIG. 3A, the write data WR from the host computer 11 are recorded as a recording data DATA of 32,768 bytes in which 4 tracks (with each track consisting of, for example 1 block) are combined as a group.

At this time, with respect to recording track TR, if the recording data DATA are less then 32,768 bytes, the first su0pplementary data PD1 is added in order to achieve 32,768 bytes in total. Further, to store an incidental information of recording track TR, a subcode data SCD of 320 bytes is employed.

As shown in FIG. 3B, for every 94 bytes of subcode data SCD, recording data DATA, or first supplementary data PD1, the data recorder control apparatus 12 added 8 bytes of a Reed-Solomon error detecting and correcting code (hereinafter referred to as "C3 code C3" corresponding to the C1 and C2 codes in the ID-1 format). The C3 code C3 is added by using a predetermined production polynomial expression, thereby improving the bit error rate.

Further as shown in FIG. 4, with respect to the subcode data SCD, the recording data DATA, the first supplementary data PD1, and the C3 code C3, these are thus formatted every recording track, and data of 4 recording tracks TR1, TR2, TR3, and TR4 are interleaved over tracks by a predetermined method, so that the bit error rate can be further improved.

Regarding the 4 recording tracks TR1, TR2, TR3, and TR4, the 204 bytes of second supplementary data PD2 is added at the beginning of each of these tracks. Thereby, data size of 1 recording track TR is attained to 36,108 bytes prescribed by the ID-1 format.

Since the beginning of track TR corresponds to a portion of the tape that is usually damaged by the magnetic heads, adding the second supplementary data PD2 to this portion of the track stabilizes the tracking of the recording track, thereby improving the bit error rate of the recording data DATA.

FIG. 5 illustrates in more detail the recording area AREC, which was originally illustrated in FIGS. 2A and 2B. As discussed previously, recording area AREC is itself comprised of recording areas DITA, NRA, UDA, and VEOVA. FIG. 5 illustrates the placement of these areas (except for VEOVA) on magnetic tape 1. In particular, FIG. 5 shows the arrangement of the oblique tracks (shown as slanted parallel lines) that together constitute areas DITA, NRA, and UDA.

The first area of magnetic tape 1 is rising area RUA, and it extends for a distance of 1.5[m] from the logical beginning LBOT of magnetic tape 1. Following the rising area RUA are a plurality of track areas that together identify the track type information TRID, which is divided between the directory information track area DITA and the user recording track area UDA. The information that constitutes track type information TRID includes, for example, the type of track TR, a block number BLNO and file number FLNO to which the recording track TR belongs, a write-retry count RTCT of the recording track TR, and a plurality of data bytes BYCT included in the recording track TR. The above-mentioned information is organized into a plurality of track areas. The first area of the track type information TRID is the volume information table VIT. The recording data DATA of the volume information table VIT includes information relating to the beginning and end positions of the data block in which the entirety of magnetic tape 1 is recorded. Volume information VIT also includes information relating to the data length of the file information table FIT, and a block number of the data block write-retried in recording.

The subsequent 256 tracks beyond the volume information table VIT constitute the file information table FIT. This table includes information relating to the beginning position and the block length of the file. After the file information table FIT, a dummy data track information DMY is recorded in a predetermined number of tracks. An update information table UIT is then recorded after the dummy track information DMY. Update information table UIT comprises 4 recording tracks, and it includes information representing the presence of an update. The next recorded area is a second dummy data track information DMY, which extends from the end of area UIT to a position that is a distance of 2.5[m] before the end of area DITA. Area MGA extends from the end of the second DMY area to the end of area DITA, and it is mentioned as a reserve area.

The next track area after area DITA is a no recorded area NRA. Recorded after area NRA is user recording track area UDA, in which the remaining portion of the track type information TRID is recorded. Track area UDA is itself divided into a plurality of areas. The first and third of such areas are the tape mark track information areas TM, and each of these areas consists of 4 tracks. In between the TM areas is the user data track information area UDT. Area UDT comprises one file composed of a plurality of information blocks. The recording data DATA and the end recording information EOR of each area TM includes the first supplementary data PD1, which comprises 32,768 bytes. The recording data area DATA of each track included in area UDT includes write data WA, which is input from host computer 11.

By placing a directory information track area DITA at the beginning of the magnetic tape 1, and by managing the contents of the user recording track area UDA as files, the data recorded to the data recorder 13 can be accessed similar to an external storage device when viewed from the host computer 11.

Figure 6:
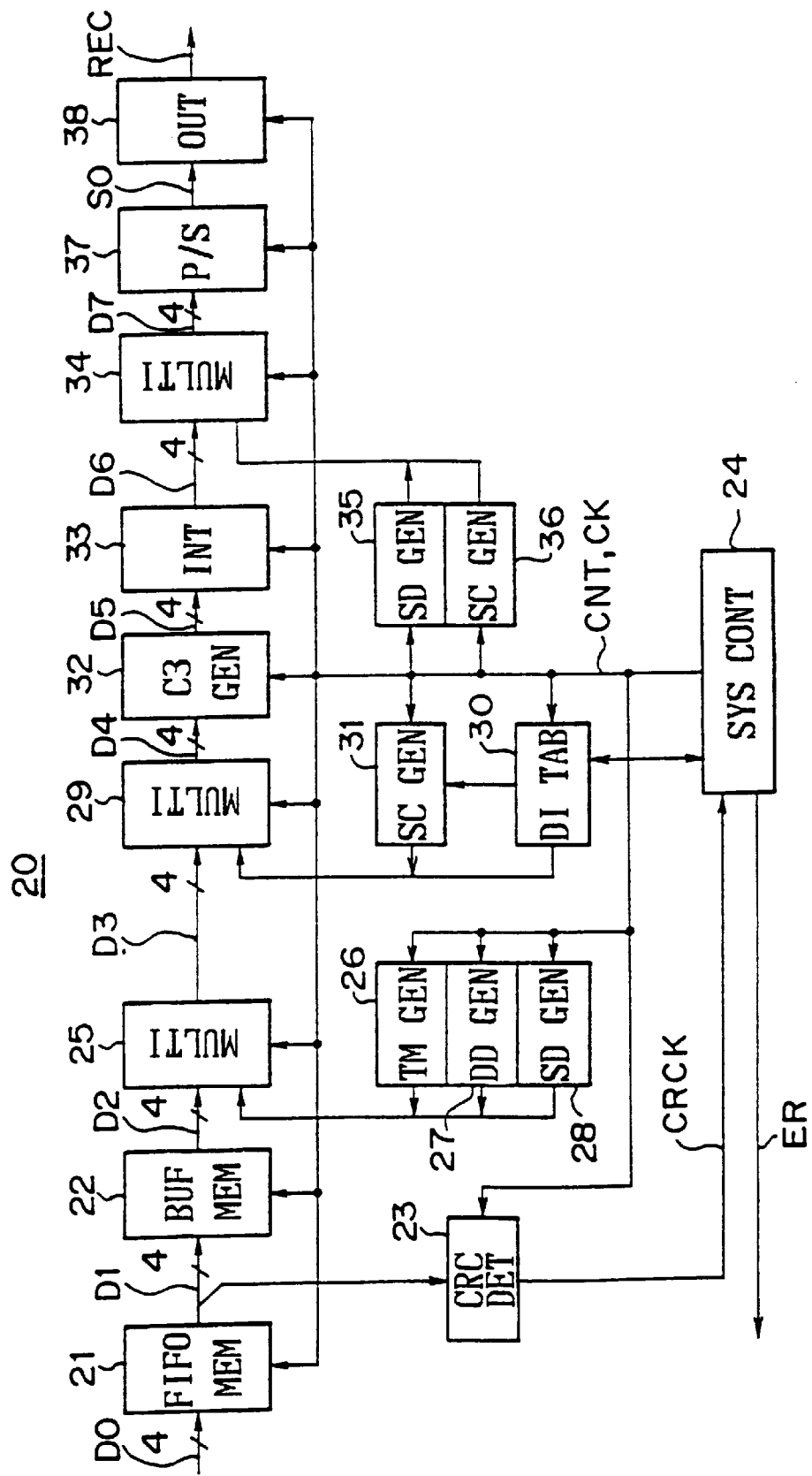
FIG. 6 is a block diagram showing a recording format control unit.
Figure 7:
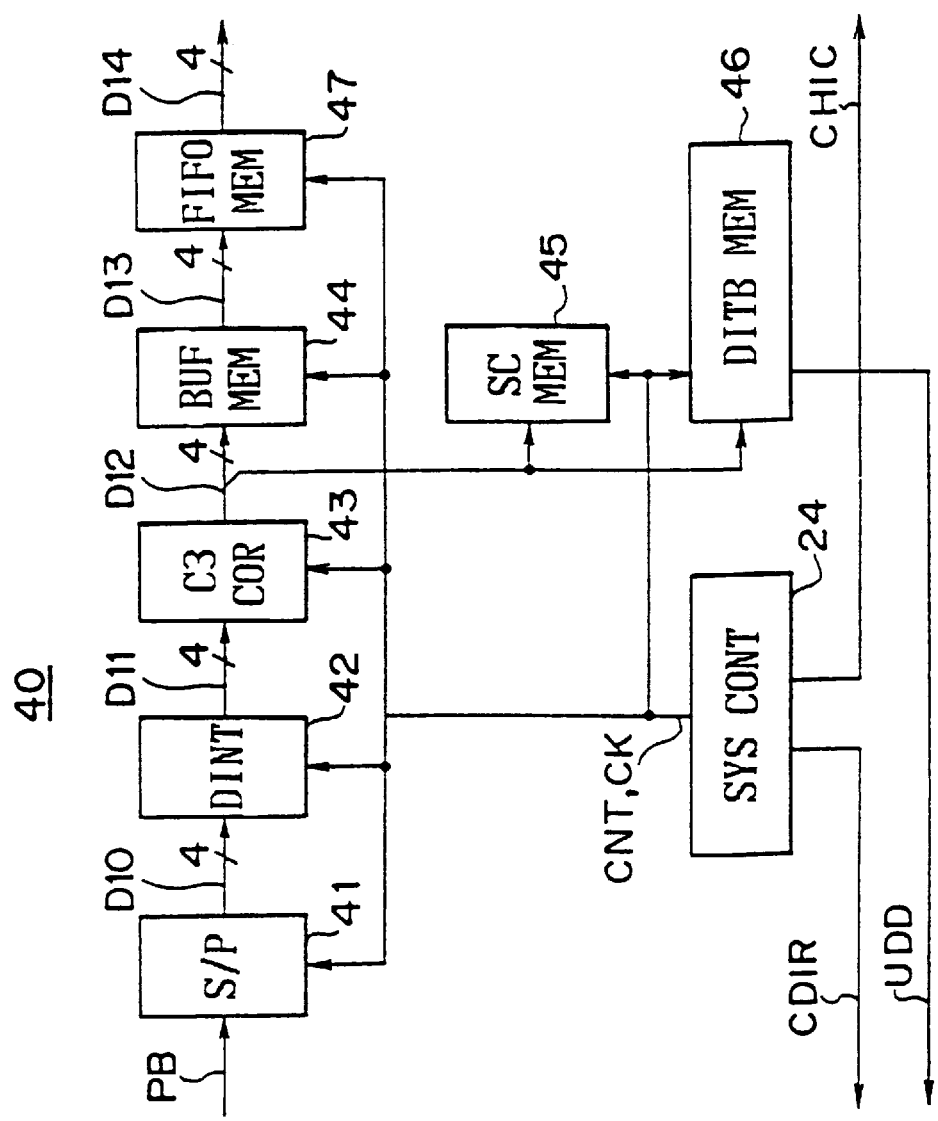
FIG. 7 is a block diagram showing the reproducing format control unit.

FIGS. 6 and 7 illustrate the format control unit 15 of the data recorder control apparatus 12, which comprises a memory 16 (not illustrated in FIGS. 6 or 7), a recording format control portion 20 and a reproducing format portion 40.

That is, in the recording format control portion 20, the data are arranged into units of 32 bits and they are input from the host interface control unit 14 to a memory circuit 21 (e.g., a FIFO) as a 4-channel, 8-bit parallel write data DO. Data DO are synchronized with an internal clock CK, and written to a buffer memory 22 as input data D1. Data D1 are also sent to a CRC error detecting circuit 23.

In the recording format control portion 20, the write data Do is processed for each of the 4 channels. However, in this description of the recording format control portion 20, the processing of only 1 channel will be described.

The CRC error detecting circuit 23 detects errors in the input data D1 by using the CRC (cyclic redundancy code), and it supplies a detection result CRCK to a system control apparatus 24, which comprises a CPU. If the detection result CRCK indicates that an error is present in input data D1, system control apparatus 24 responds to such an indication by sending an error detecting signal ER to the host interface control portion 14. The host interface control portion 14 responds to error detecting signal ER by retransmitting the write data DO, which is error-detected for a second time according to the method discussed above.

A buffer memory 22 buffers the input data D1 for 1 recording track TR (as shown in FIGS. 3A and 3B) and obtains the corresponding recording data DATA. The buffer memory 22 then transmits to multiplexer 25 buffer data D2 corresponding to the recording data DATA.

Besides being supplied with buffer data D2, multiplexer 25 is also supplied with first supplementary data PD1, which is extracted from the tape mark track information TM by tape mark generating circuit 26. Multiplexer 25 is also supplied with dummy data that is extracted from the DMY areas of tape 1 by dummy data generating circuit 27, and with first supplementary data PD1 that is extracted from the recording data DATA area by supplementary data generating circuit 28.

Thereby, in the first multiplexer 35, the first supplementary data PD1 is added to the recording data DATA of the first buffer data D2 corresponding to a control signal CNT input from a system control apparatus 24 to generate the second buffer data D3, and this is output to the second multiplexer 29.

The second multiplexer 29 receives, in addition to the second buffer data D3, the directory information table DIT output from a directory information table memory 30, and the subcode data SDC which is generated by a subcode generating circuit 31 based on the contents of the directory information table 30.

The directory information table memory 30 stores the directory information table DIT described above with respect to FIG. 5. The subcode generating circuit 31 generates the beginning and end positions information of the data block, the length information of the file information table FIT, and the block number of the data block executing the write-retry in recording etc., corresponding to the contents of the directory information table DIT.

Thereby, the second multiplexer 25 adds the subcode data SCD to the second buffer data D3 corresponding to the control signal CNT input from the system control circuit 24, in order to generate the format described above with respect to FIGS. 3A and 3B. Second multiplexer 25 sends this data to a C3 code generating circuit 32 as the third buffer data D4.

The C3 code generating circuit 32 generates an 8 byte C3 code C3 as described above with respect to FIGS. 3A and 3B, and it adds this code to the buffer data D4. The resultant code is designated as recording track data D5, which is sent by C3 code generating circuit 32 to interleave circuit 33.

The interleave circuit 33 sequentially takes in the recording track data D5 in groups of 4 tracks into an interleave memory (not shown), which interleaves the received recording track data D5 so as to produce a group of 4 tracks as depicted in FIG. 4. This interleaved group of 4 tracks is designated as the second recording track data D6, and this data is supplied to the third multiplexer 34.

The third multiplexer 34 adds to the second recording track data D6 the second supplementary data PD1 (which is supplied from the second supplementary data generating circuit 35), and the synchronizing code data (which is supplied from a synchronizing code generating circuit 36 and which corresponds to the control signal CNT input from the system control circuit 24).

Thereby, the third multiplexer 34 adds the second supplementary data PD2 and the synchronizing code data to the second recording track data D6. The output of the third multiplexer 34 is designated as the third recording track data D7, and it is supplied to a parallel/serial converting circuit 37.

The parallel/serial converting circuit 37 converts the third recording track data D7 into a serial recording data SO of 32 bits. This serial data SO is then input to the data recorder 13 as a recording data REC via an output circuit 38.

Figure 11:
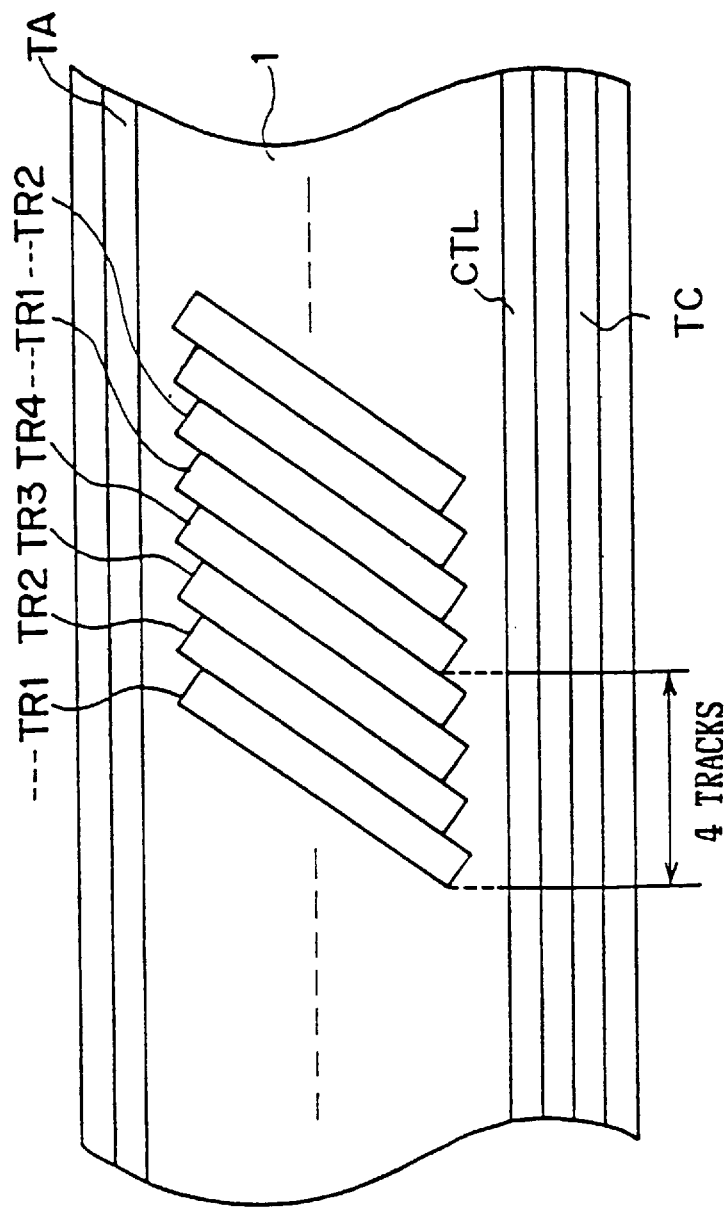
FIG. 11 is a schematic diagram explaining the ID-1 format used in a previously proposed magnetic recording and/or reproducing apparatus.
Figure 12:
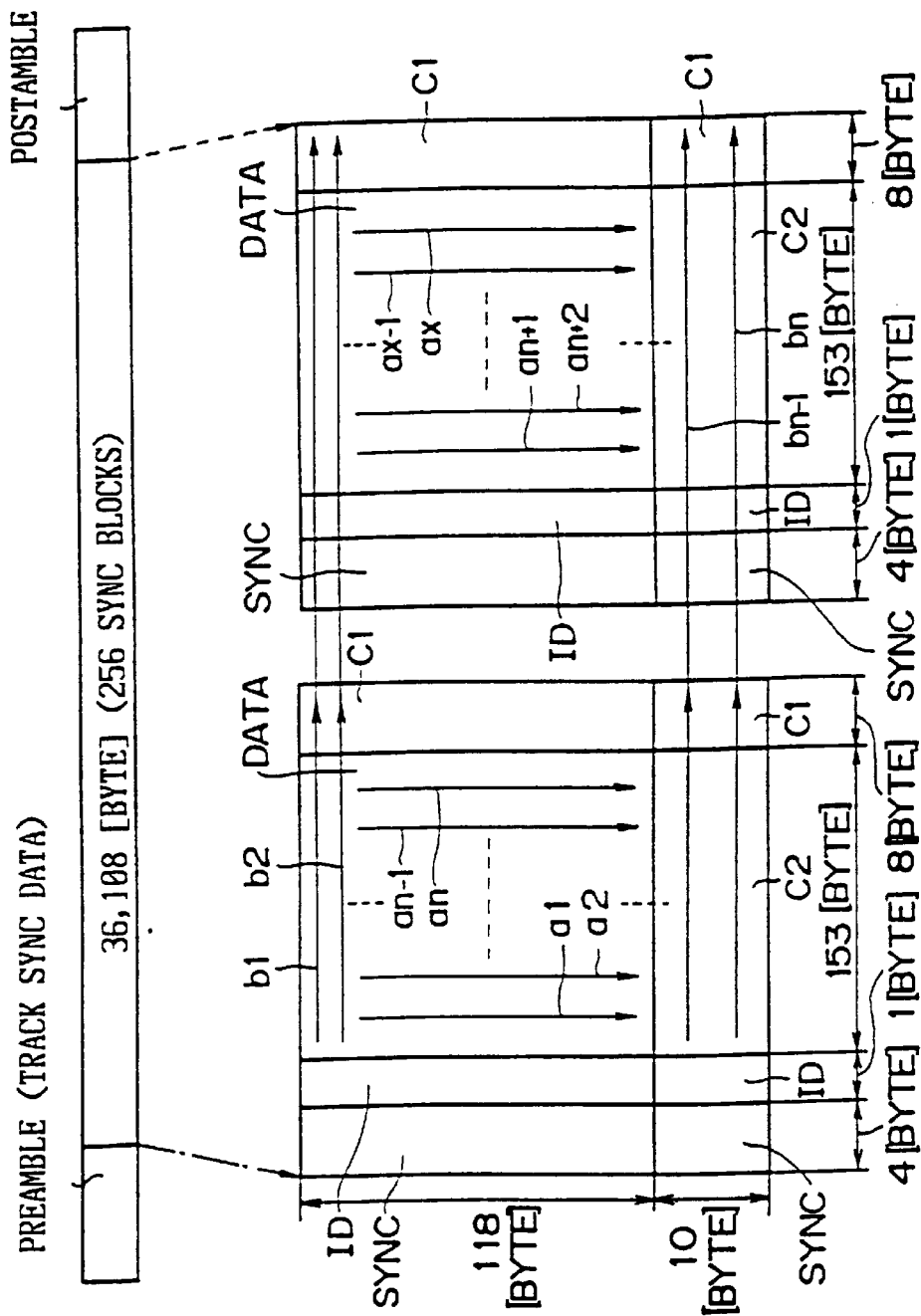
FIG. 12 is a schematic diagram explaining the interleave-processing used in the previously proposed magnetic recording and/or reproducing apparatus.

In this way, the recording format control portion 20 of the format control unit 15 receives the write data DO from the host interface control unit 14 and generates the recording data REC by executing the format processing described above with respect to FIGS. 3A, 3B, 4, and 5. The recording format control portion 20 then records recording data REC onto magnetic tape 1 in a manner that complies with the ID-1 format as shown in FIGS. 11 and 12.

In the reproducing format portion 40 shown in FIG. 7, a serial reproducing data PB reproduced by the data recorder 13 is input to a serial/parallel converting circuit 41. The serial/parallel converting circuit 41 converts this data into the first reproducing data D10, which is output as a 4-channel, 8-bit parallel sequence of data comprising 32 bits. The first reproducing data is then supplied to a deinterleave circuit 42.

The deinterleave circuit 42 sequentially receives the first reproducing data D10 and deinterleaves this received data in order to reverse the interleave processing performed by the interleave circuit 33. The output of deinterleave circuit 42 is designated as the second reproducing data D11, which is supplied to a C3 error correcting circuit 43.

The C3 error correcting circuit 43 error-corrects the second reproducing data D11 by using the C3 code C3 added by the C3 code generating circuit 32 of the recording format portion 20, thereby generating the third reproducing data D12.

The third reproducing data D12 is divided into the user recording data UDT, as shown in FIG. 5, and the directory information table DIT. The user recording data UDT are supplied to buffer memory 44, and the directory information table DIT is supplied to subcode memory 45 and directory information table memory 46.

In the buffer memory 44, the first supplementary data PD1 included in the third reproducing data D12 is deleted and input to a memory circuit 47 as the fourth reproducing data D13, and it is synchronized with the external clock. The synchronized fourth reproducing data D13 is output to the host interface control unit 14 as a read data D14.

Additionally, when the directory information table DIT input to the directory information table memory 46 has been updated, the system control circuit 24 sends the update information UDD of the directory information table DIT to the data recorder 13 with a data recorder control signal CDIR, in order to update the contents of the directory information table DIT on the magnetic tape 1.

The system control circuit 14 also sends a reply (as a control signal CHIC generating the output date D14), to the host interface control unit 14 when the host interface control unit 14 generates a request for data reproduction.

In such a manner, the reproducing format control portion 40 of the format control unit 15 receives reproducing data PB reproduced by the data recorder 13, and generates read data D14 by reversing the format depicted in FIGS. 3A, 3B, 4, and 5. Read data D14 is then sent to the host interface control unit 14.

In the data recorder control apparatus 12, when the recording data DATA is generated by the recording format control portion 20, a reference signal TREC used for searching is simultaneously generated, and at the start of recording, it is recorded to the recording track TC along the longitudinal direction of the magnetic tape 1.

Figures 8, 9:
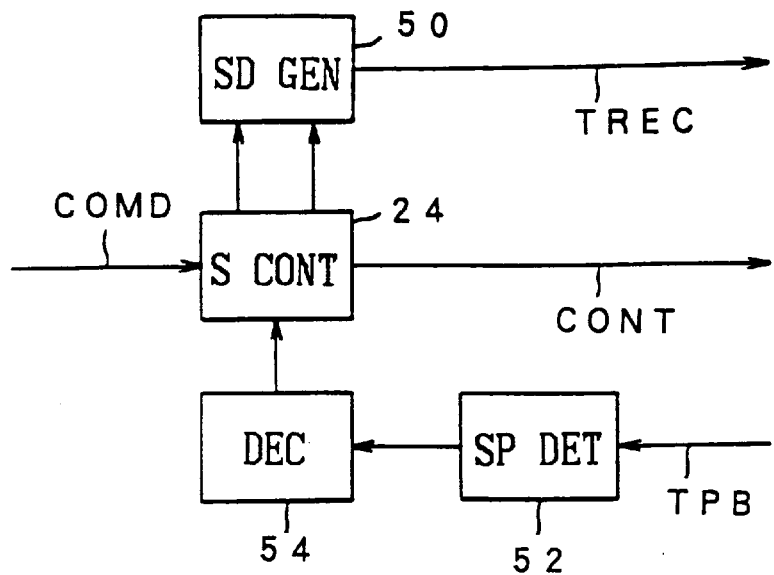
FIG. 8 is a block diagram showing the search circuit.
FIG. 9 is a schematic diagram explaining the tape mark track.

That is, as shown in FIG. 8, the system control circuit 24 outputs a control signal to a search data generating circuit 50, which generates reference signal TREC.

Here, the reference signal TREC is a search pattern that comprises an alternating sequence of 1's and 0's. A search data corresponding to the file information table FIT of the directory information track area DITA is recorded as well.

Therefore, in the data recorder control apparatus 12, the head of files can be detected easily by detecting the search pattern signal.

In the system control circuit 24, when recording the data in each unit of files, a tape mark track TM is formed at the head of respective files in order to have the head of respective files detected with reference to the tape mark track TM.

Here as shown in FIG. 9, the tape mark track TM includes a tape mark ID indicating that the ensuing code is the tape mark track TM (in this case, a data of "0000FF00" is allocated), the block number and track number of the above tape mark track TM, the number of times of write-retry, a file number which is recorded next to the tape mark track TM, a block number, and an end pattern comprising a plurality of 0's. These contents of the tape mark tracks TM are considered to be incidental information stored at the subcode data SCD.

With respect to FIG. 10, in the recording data recorded to the first information table FIT, data corresponding to tape mark tracks TM are sequentially recorded in units of 2 words from the beginning of the magnetic tape 1.

That is, a track set ID of the tape mark track TM (as shown in FIG. 11) is recorded at the head of the words, and the block number of respective tape mark track TM is recorded to the succeeding word.

Therefore, in the system control circuit 24, the above file information table FIT is updated every time each file is updated or recorded.

Thereby, in the computer system 10, the tape mark track TM of the track set ID corresponding to the block number can be searched based on the block number of the file information table FIT, so that a desired file can be easily accessed on the basis of the above detected result.

With respect to the track set ID and the block number recorded to the file information table FIT, the system control circuit 24 records the tape mark ID at the first word position, and then records the block number.

Thereby, in the above computer system 10, a desired file can be searched with reference to the reproducing signal of the recording track TC.

In this manner, by recording the search data corresponding to the file information table FIT, even if the contents of the file information table FIT become partially or completely erased, the desired file can nevertheless be accessed easily.

That is, in the system control circuit 24, when accessing a file, the control signal CONT is output to the data recorder 13 in order to first reproduce the data of the directory information track area DITA.

At this time, the desired track set ID is detected and it corresponds to the recording data of the file information table FIT. Subsequently, the magnetic tape 1 is fast forwarded to the track set ID.

In the system control circuit 24, the reproducing signal TPB of the recording track TC is supplied to the search pattern detecting circuit 52. As a result, if the search pattern is detected, the data recorder 13 is switched to the reproducing mode. Further, the system control circuit 24 detects the track set ID and the block number by supplying the reproducing signal TPB of a subsequent recording track TC to decoder 54.

If this track set ID matches the track set ID detected by the file information table FIT, the system control circuit 24 supplies to the host computer the recorded data D14 reproduced by the reproducing format control portion. On the contrary, if these track set IDs do not match, the system control circuit 24 outputs the control signal CONT to the data recorder 13 to detect the succeeding search pattern.

According to the above construction, data for searching is recorded to the recording track along the longitudinal direction of the magnetic tape 1; therefore, even if the beginning portion of the magnetic tape corresponding to the management data is damaged, a desired file can nevertheless be easily accessed by reproducing the above search data.

Note that the present invention is not limited to the embodiment described above, and that certain modifications may be made thereto without departing from the scope of the invention. For instance, the search pattern described above and consisting of a sequence of alternating 1's and 0's may be changed to comprise any other predetermined pattern.

Further, in the embodiments described above, the track set ID and the block number are recorded with the search pattern. However, this invention may be modified so that these codes are recorded in combination with other various kinds of data.

Furthermore, in the embodiments described above, this invention is applied to the D-1 format data recorder. However, this invention is not limited to this, but may be widely applied to magnetic recording apparatuses for recording various kinds of data.

What is claimed is:

1. A magnetic recording and/or reproducing apparatus comprising:

a file management device for outputting a plurality of predetermined files; and a magnetic recording apparatus for recording said plurality of predetermined files in a first predetermined number of helical recording tracks on a magnetic tape, said first predetermined number of helical recording tracks being arranged into a plurality of track groups, each of said plurality of track groups comprising a second predetermined number of helical recording tracks, said second predetermined number of helical recording tracks being less than said first predetermined number of helical recording tracks, wherein the entire content of each of said plurality of track groups is independently interleaved in accordance with a predetermined technique, said magnetic tape includes a tape mark track having tape mark data prior to the files in the helical recording tracks and a header area which includes a management area, and management information representing the beginning recording position of each of said plurality of predetermined files is recorded in said management information area of said helical recording tracks, said magnetic tape further includes a longitudinal track selectively extending along a longitudinal direction of said magnetic tape at the upper or lower side of said helical recording tracks, said longitudinal recording track includes a search area of each of said plurality of predetermined files, and search pattern information is recorded in said search area, said search pattern information being followed by said management information, and said management information of each of said plurality of predetermined files being recorded at the beginning recording position of each of said plurality of predetermined files, and wherein the information from only one longitudinal track is utilized in performing a relatively high-speed search operation for locating said tape mark track.

2. The magnetic recording and/or reproducing apparatus of claim 1, wherein at least one of said helical recording tracks in each of said plurality of track groups includes subcode data, at least one of said helical recording tracks in each of said plurality of track groups includes a portion of said predetermined file data, at least one of said helical recording tracks in each of said plurality of track groups includes a first supplementary data code, at least one of said helical recording tracks in each of said plurality of track groups includes an error correction code, and wherein each of said first predetermined number of helical recording tracks includes a second supplementary code.

3. A magnetic recording and/or reproducing apparatus comprising:

a file management device for outputting a predetermined file data; and a magnetic recording apparatus for recording said predetermined file data to a first predetermined number of helical recording tracks on a magnetic tape, said first predetermined number of helical recording tracks being arranged into a plurality of track groups, each of said plurality of track groups comprising a second predetermined number of helical recording tracks, said second predetermined number of helical recording tracks being less than said first predetermined number of helical recording tracks, wherein the entire content of each of said plurality of track groups is independently interleaved in accordance with a predetermined technique, wherein said magnetic tape includes a tape mark track having tape mark data prior to the file data in the helical recording tracks, wherein a header area of said magnetic tape contains a management information area, and management information representing the beginning recording position of said file data is recorded on said helical recording tracks in said management information area, wherein a longitudinal track extending along a longitudinal direction of said magnetic tape is selectively recorded at the upper or lower side of said helical recording tracks, and said longitudinal track contains a search area having search pattern information and identification data information corresponding to said tape mark data in which said search pattern information is located prior to said identification data information, wherein the information from only one longitudinal track is utilized in performing a relatively high-speed search operation for locating said tape mark track, and wherein at least one of said helical recording tracks in each of said plurality of track groups includes subcode data, at least one of said helical recording tracks in each of said plurality of track groups includes a portion of said predetermined file data, at least one of said helical recording tracks in each of said plurality of track groups includes a first supplementary data code, at least one of said helical recording tracks in each of said plurality of track groups includes an error correction code, and each of said first predetermined number of helical recording tracks includes a second supplementary code.

4. A magnetic recording and/or reproducing apparatus comprising:

a device for outputting file data; and a magnetic recording apparatus for recording said file data on helical recording tracks on a magnetic tape and for recording tape mark data in a helical tape mark track such that said tape mark data in said tape mark track precedes said file data of said helical recording tracks, said magnetic recording apparatus further recording search pattern information and identification data information corresponding to said tape mark data in one longitudinal track extending along a longitudinal direction of said magnetic tape such that said search pattern information is located prior to said identification data information, wherein said search pattern information and said identification data information recorded in said longitudinal track enable a relatively high-speed search to be performed to locate said tape mark track and said file data, and wherein the information from only one longitudinal track is utilized in performing said relatively high-speed search.

5. A magnetic recording and/or reproducing apparatus comprising:

means for supplying file data, tape mark data, identification data information corresponding to said tape mark data, and search pattern information;

means for recording said file data, said tape mark data, said identification data information and said search pattern information onto a magnetic tape and for reproducing the same therefrom; and means for controlling a recording format of said file data, said tape mark data, said identification data information and said search pattern information such that said file data is recorded on helical recording tracks on said magnetic tape, said tape mark data is recorded in a helical tape mark track which precedes the helical recording tracks having said file data, and said identification data information and said search pattern information are recorded in one longitudinal track extending in a longitudinal direction of said magnetic tape in which said search pattern information is located prior to said identification data information, wherein said search pattern information and said identification data information in said longitudinal track enable a relatively high-speed search to be performed to locate said tape mark track and said file data, and wherein the information from only one longitudinal track is utilized in performing said relatively high-speed search.

* * * * *